(12) United States Patent
Nelson

(10) Patent No.: US 11,499,467 B2
(45) Date of Patent: Nov. 15, 2022

(54) EXHAUST SENSOR WITH HIGH-TEMPERATURE TERMINAL

(71) Applicant: DELPHI TECHNOLOGIES IP LIMITED, St. Michael (BB)

(72) Inventor: Charles S. Nelson, Fenton, MI (US)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 358 days.

(21) Appl. No.: 16/537,840

(22) Filed: Aug. 12, 2019

(65) Prior Publication Data

US 2021/0047958 A1 Feb. 18, 2021

(51) Int. Cl.

| | |
|---|---|
| *F01N 11/00* | (2006.01) |
| *G01N 27/407* | (2006.01) |
| *G03B 17/14* | (2021.01) |
| *G03B 17/56* | (2021.01) |
| *H04N 5/225* | (2006.01) |
| *G03B 17/02* | (2021.01) |
| *G02B 27/64* | (2006.01) |
| *G02B 7/14* | (2021.01) |

(52) U.S. Cl.
CPC ......... *F01N 11/002* (2013.01); *G01N 27/407* (2013.01); *G02B 7/14* (2013.01); *G02B 27/646* (2013.01); *G03B 17/02* (2013.01); *G03B 17/14* (2013.01); *G03B 17/56* (2013.01); *H04N 5/225* (2013.01); *F01N 2260/20* (2013.01); *F01N 2560/025* (2013.01)

(58) Field of Classification Search
CPC .. G01N 27/4077; G01N 27/12; G01N 27/407; G01N 33/0009; G01M 33/0031; F01N 11/002; F01N 2260/20; F01N 2560/025

USPC ........................................................ 73/31.05
See application file for complete search history.

(56) References Cited

U.S. PATENT DOCUMENTS

| | | | | |
|---|---|---|---|---|
| 4,183,611 | A | * | 1/1980 | Casciotti ................ H01R 4/028 228/118 |
| 4,625,400 | A | * | 12/1986 | Fister ..................... H01R 43/16 228/197 |
| 4,701,739 | A | * | 10/1987 | Sasaki .................... G01N 27/12 29/592.1 |
| 5,795,545 | A | * | 8/1998 | Koripella ........... G01N 27/4075 338/24 |

(Continued)

*Primary Examiner* — Clayton E. LaBalle
*Assistant Examiner* — Kevin C Butler
(74) *Attorney, Agent, or Firm* — Joshua M. Haines

(57) ABSTRACT

An exhaust sensor includes a sensing element with a ceramic sensing element substrate and a sensing element terminal which is electrically conductive and which is supported by the ceramic sensing element substrate such that the sensing element is configured to sense constituents of exhaust gases when exposed thereto. The exhaust sensor also includes a mating terminal which is electrically conductive and which is in electrical communication with the sensing element terminal. The mating terminal has a base material and a clad material bonded to the base material such that the clad material contacts the sensing element terminal and such that the clad material is located between the sensing element terminal and the base material, thereby providing the electrical communication. The clad material is an alloy which is less than or equal to 20% iron, greater than or equal to 40% nickel, and greater than or equal to 13% chromium.

18 Claims, 10 Drawing Sheets

(56) References Cited

U.S. PATENT DOCUMENTS

| | | | | |
|---|---|---|---|---|
| 5,840,418 A * | 11/1998 | Makita | | B44C 1/26 428/67 |
| 6,244,901 B1 * | 6/2001 | Fujii | | H01R 4/185 439/595 |
| 6,415,647 B1 * | 7/2002 | Yamada | | G01N 27/4062 204/424 |
| 6,733,326 B2 * | 5/2004 | Lee | | H01R 12/592 439/495 |
| 6,780,070 B2 * | 8/2004 | Ishikawa | | H01R 13/4362 439/752 |
| 7,004,796 B2 * | 2/2006 | Fukuda | | H01R 43/048 439/752 |
| 7,232,323 B2 * | 6/2007 | Mohs | | H01R 13/18 439/265 |
| 7,500,875 B2 * | 3/2009 | Lamdiziz | | H01R 13/4362 439/595 |
| 7,563,118 B1 * | 7/2009 | McCauley | | H01R 13/533 439/260 |
| 8,172,624 B2 * | 5/2012 | Tiberio, Jr. | | H01R 13/41 439/733.1 |
| 8,246,368 B2 * | 8/2012 | Buethe | | H01R 13/6275 439/259 |
| 9,160,082 B2 * | 10/2015 | Heringhaus | | H01R 13/193 |
| 9,407,047 B1 * | 8/2016 | McCauley | | H01R 13/432 |
| 2002/0177341 A1 * | 11/2002 | Stein, Sr. | | H01R 13/193 439/260 |
| 2003/0024300 A1 * | 2/2003 | Kojima | | G01N 27/4077 73/31.05 |
| 2003/0209433 A1 * | 11/2003 | LaBarge | | C23C 14/083 204/426 |
| 2004/0040370 A1 * | 3/2004 | Kojima | | G01N 27/4077 73/31.05 |
| 2006/0213254 A1 * | 9/2006 | Satou | | G01N 27/4077 73/31.05 |
| 2006/0288806 A1 * | 12/2006 | Nelson | | G01N 27/4062 73/866.5 |
| 2007/0080074 A1 * | 4/2007 | Wang | | G01N 27/4073 205/780.5 |
| 2007/0080075 A1 * | 4/2007 | Wang | | G01N 27/4074 205/781 |
| 2007/0272431 A1 * | 11/2007 | Yamauchi | | G01N 27/407 174/138 F |
| 2010/0147052 A1 * | 6/2010 | Nelson | | G01N 15/0656 73/28.01 |
| 2015/0354996 A1 * | 12/2015 | Nelson | | B23K 11/14 73/431 |
| 2018/0252672 A1 * | 9/2018 | Wang | | G01N 27/417 |
| 2021/0047958 A1 * | 2/2021 | Nelson | | F01N 11/002 |

\* cited by examiner

EXHAUST SENSOR WITH HIGH-TEMPERATURE TERMINAL

TECHNICAL FIELD OF INVENTION

The invention relates to exhaust sensors which are used to sense constituents of exhaust gases, more particularly to a terminal of the exhaust sensor which is suitable for high-temperature operation and which is robust to abrasion with a ceramic sensing element during manufacture.

BACKGROUND OF INVENTION

The automotive industry has used exhaust sensors in automotive vehicles for many years to sense the constituents in exhaust gases which are communicated through an exhaust conduit of an internal combustion engine. By way of non-limiting example only, exhaust sensors have been used to sense concentrations of oxygen, NOx, ammonia, and particulate matter. It is common for such exhaust gas sensors to include a sensing element which has a ceramic substrate which supports various electrodes and electrical leads which, when exposed to the exhaust gases, are able to produce an electrical signal that can be used to determine the concentration of a target constituent in the exhaust gases. The ceramic substrate has one or more electrical contacts which mate with an electrical terminal of a wire which supplies power to, transmits a signal from, or provides a path for the sensing element.

Decreasing the size of the exhaust sensors has been an area of endeavor recently, however making the exhaust sensor smaller results in challenges. One challenge that arises is that the interface between the electrical contacts of the sensing element and the electrical terminals is brought closer to the hot exhaust gases which increases the temperature of this interface. When conventional materials are used for the electrical terminal, an oxide layer can form which compromises the integrity of the electrical connection between the electrical contacts of the sensing element and the electrical terminals. One way to prevent formation of this oxide layer on the electrical terminal is to provide gold plating on the base material of the electrical terminal on the portion of the electrical terminal which makes electrical contact with the electrical contacts of the sensing element. This arrangement is illustrated in United States Patent Application Publication No. 2004/0040370 A1 to Kojima. It is also known in the prior art to use other precious metals and to inlay the precious metal into the base material. However, using gold plating, or other precious metals, presents its own challenges. For example, during manufacturing of the exhaust sensor, the terminals slide over the ceramic substrate where a high normal force, in excess of 1N and typically in a range of 4N to 12N, is exerted on the terminal against the ceramic substrate. This high normal force, together with the abrasive nature of the ceramic substrate, can scratch off the gold plating, thereby allowing an oxide layer to form with the base material of the terminal during use. Furthermore, it may be cost-prohibitive to make the gold plating thick enough to survive this assembly process. Still furthermore, the exhaust sensor is exposed to an operating environment which subjects the interface to vibrations. These vibrations can cause movement between the gold plating of the terminals and the electrical contacts of the sensing element which also causes the gold plating to wear off, thereby allowing an oxide layer to form with the base material of the terminal during use. In order to prevent or minimize movement between the gold plating of the terminals and the electrical contacts of the sensing element, an arrangement to better hold the terminals in place with the electrical contacts of the sensing element would be needed which would be cost prohibitive. Yet another approach to prevent formation of this oxide layer, with or without including a precious metal, is to increase the normal force between the terminal and the sensing element. However, increasing the normal force creates difficulty in inserting the sensing element into the terminals because the sensing element, which is ceramic, is prone to breaking due to the increased insertion force. Furthermore, increasing the normal force does not completely eliminate movement of the terminal, and as a result, formation of an oxide layer is still possible.

Another way to prevent formation of an oxide layer on the electrical terminal is to make the electrical terminal from a highly oxidation resistant material such as stainless steel which is high in nickel and chromium. However, stainless steels which are high in nickel and chromium are typically not suited to forming the complex geometries of the electrical terminals which are necessary to mate with complementary wires and to hold the electrical terminals in position within the exhaust sensor.

What is needed is an exhaust sensor with an electrical terminal which minimizes or eliminates one or more of the shortcomings as set forth above.

SUMMARY OF THE INVENTION

Briefly stated, an exhaust sensor includes a sensing element with a ceramic sensing element substrate and a sensing element terminal which is electrically conductive and which is supported by the ceramic sensing element substrate such that the sensing element is configured to sense constituents of exhaust gases when exposed thereto and a mating terminal which is electrically conductive and which is in electrical communication with the sensing element terminal, the mating terminal having a base material and a clad material bonded to the base material such that the clad material contacts the sensing element terminal and such that the clad material is located between the sensing element terminal and the base material, thereby providing the electrical communication. The clad material is an alloy comprising, by weight, less than or equal to 20% iron, greater than or equal to 40% nickel, and greater than or equal to 13% chromium.

The mating terminal as described herein with the base material and the clad material provides an economical arrangement which is resistive to forming an oxide layer during operation, thereby maintaining a robust electrical connection with the sensing element terminal.

BRIEF DESCRIPTION OF DRAWINGS

The present invention will now be described, by way of example with reference to the accompanying drawings, in which.

DETAILED DESCRIPTION OF INVENTION

Figure 1:
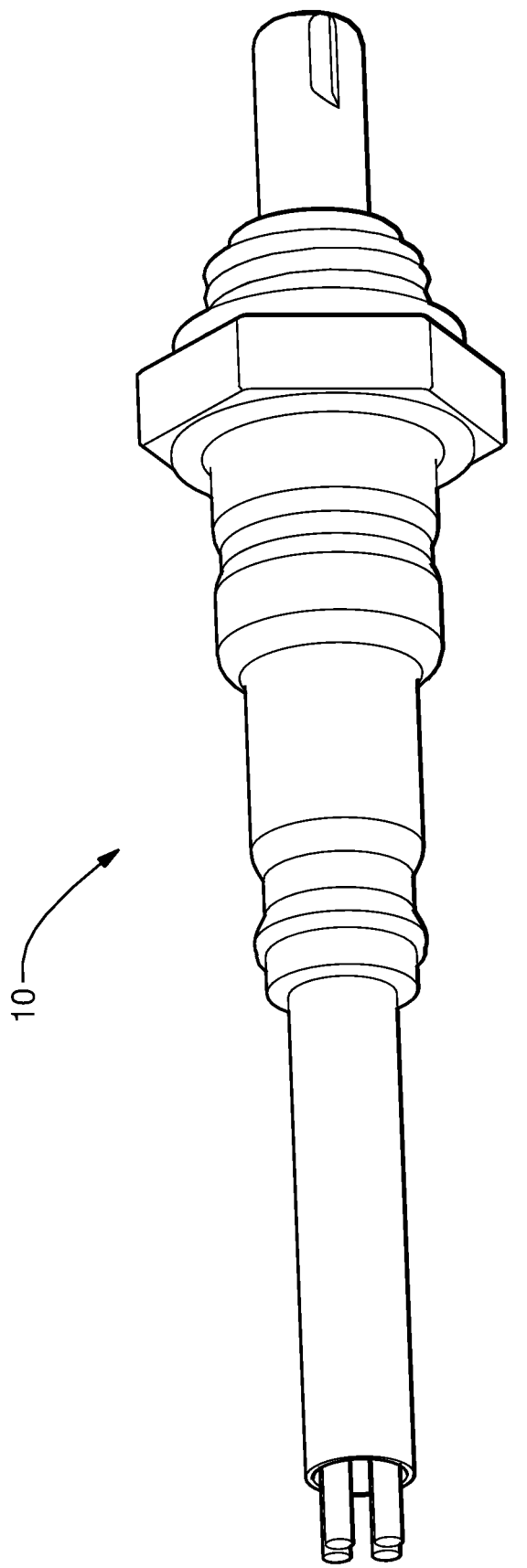
FIG. 1 is a perspective view of an exhaust sensor according to one embodiment.
Figure 2:
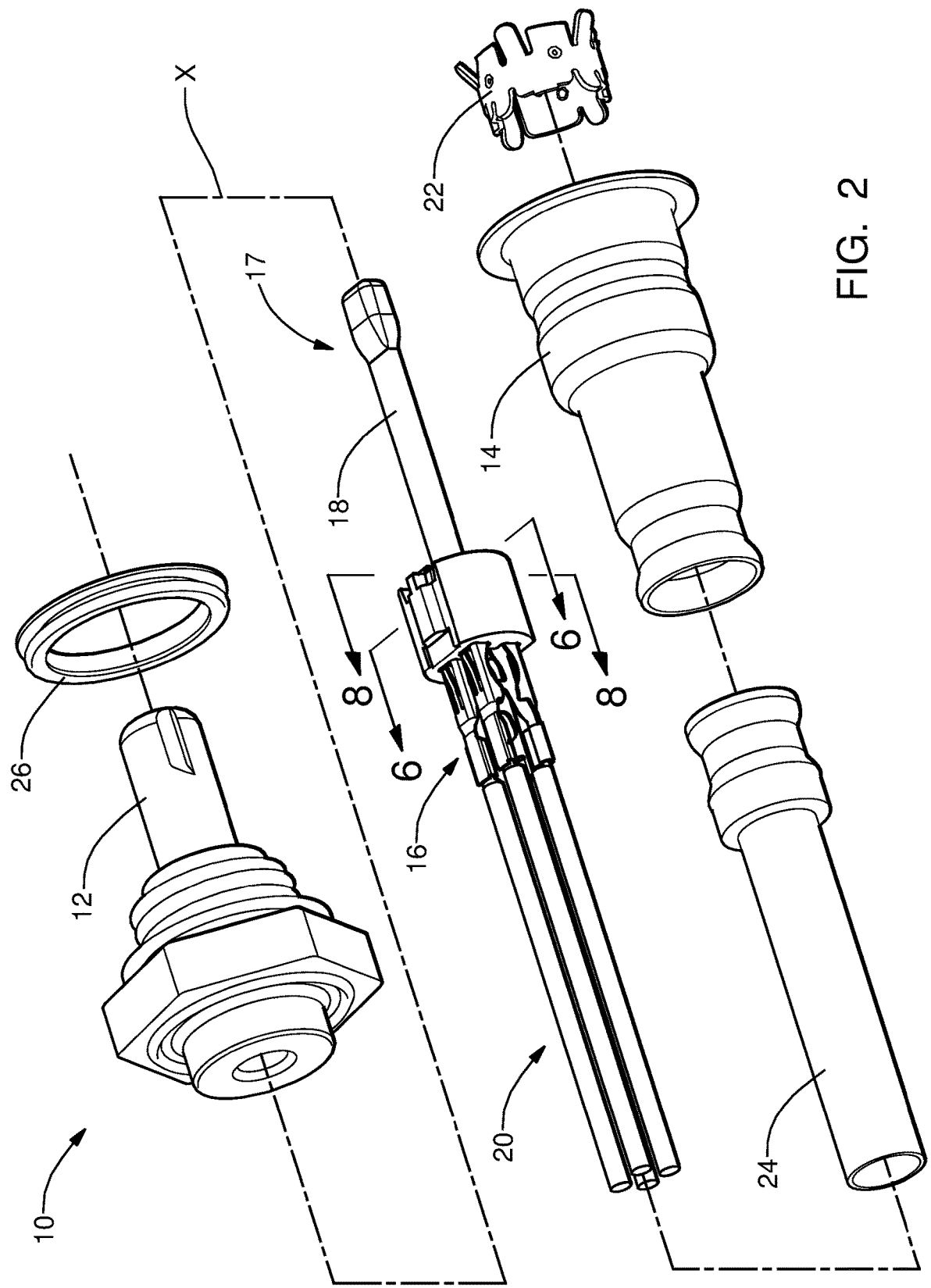
FIG. 2 is an exploded perspective view of the exhaust sensor of FIG. 1 including an electrical connector assembly according to one embodiment.

As illustrated in FIG. 1 an exhaust sensor 10 in accordance with the present disclosure is provided for sensing constituents of exhaust gases, for example exhaust gases produced by an internal combustion engine (not shown). As shown in FIG. 2, the exhaust sensor 10 includes a front housing 12, a rear housing 14, an electrical connector assembly 16 configured to interconnect a sensing element 17 with sensing element substrate 18, which contains the exhaust sensor circuitry, to a plurality of wire cables 20, a clip 22 configured to secure the electrical connector assembly 16 within the rear housing 14, a protective sleeve 24 to protect the wire cables 20, and a gasket 26 for mounting the front housing 12.

Figure 3:
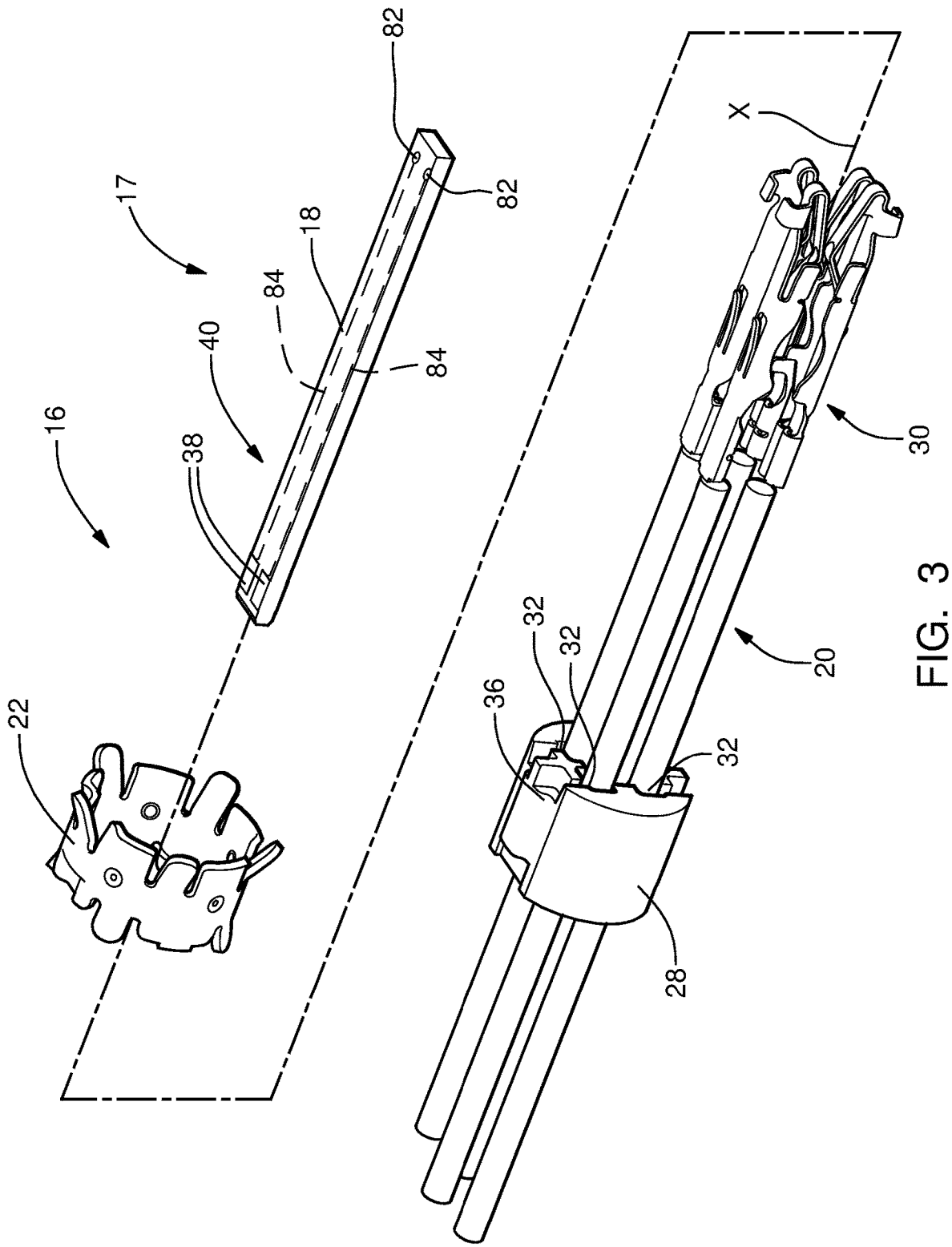
FIG. 3 is an exploded perspective view of the electrical connector assembly shown in FIG. 2 according of one embodiment.
Figure 4:
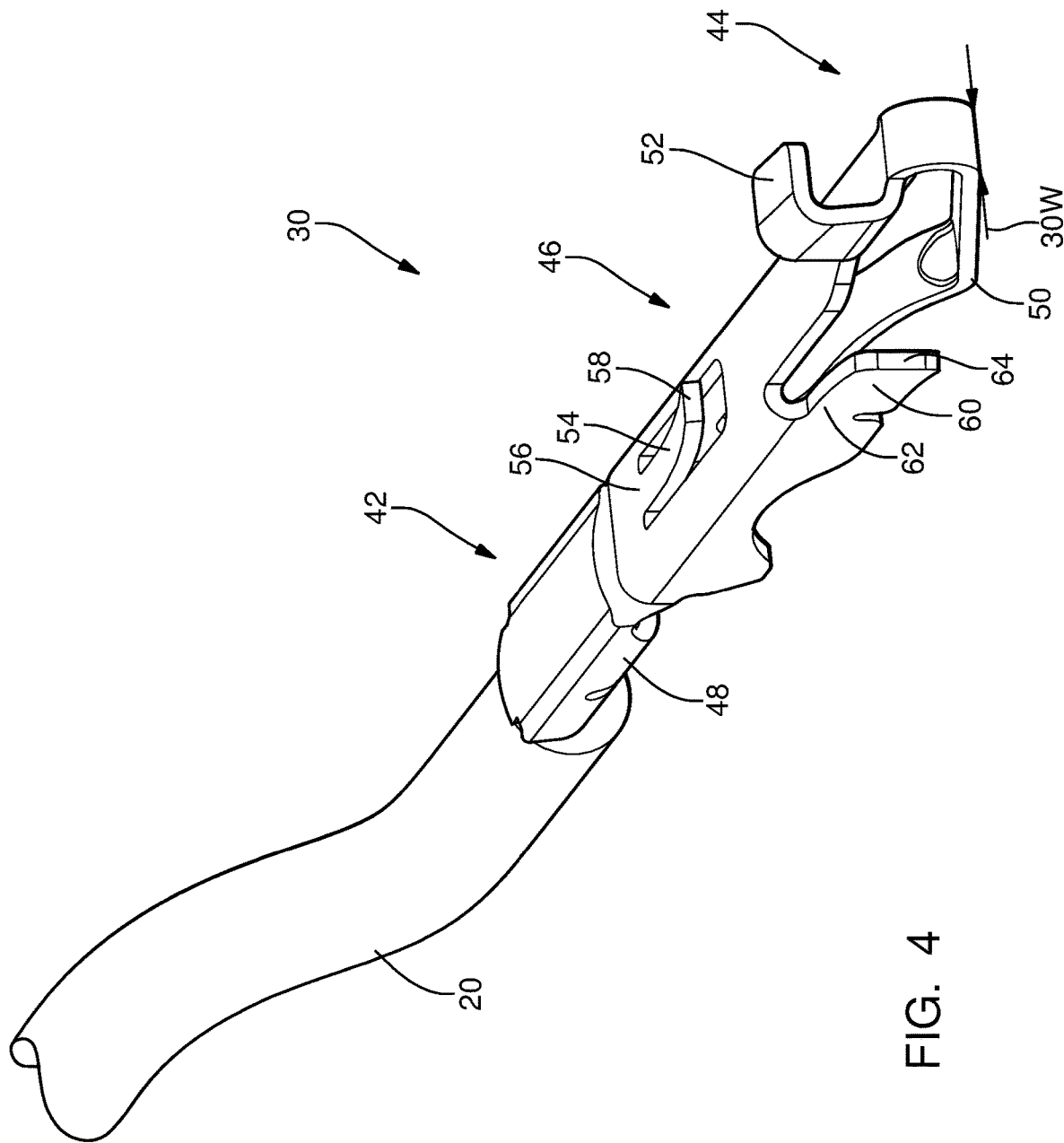
FIG. 4 is a perspective view of a terminal of the electrical connector assembly of FIG. 3 according to one embodiment.

The details of the electrical connector assembly 16, hereinafter referred to as the connector 16 are shown in FIGS. 3 and 4. The connector 16 is made up of an insulative connector body 28 and at least one mating electrically conductive terminal 30 that, when fully assembled, is at least partially disposed within a cavity 32 defined by the connector body 28. The cavity 32 is defined along a longitudinal axis X and extends from an opening 34 in a front surface 36 of the connector body 28 through to another opening in a rear surface (not shown due to perspective) of the connector body 28. According to the illustrated embodiment, the connector body 28 has four cavities 32 with a generally square cross section. Other embodiments with cavities having more or fewer cavities with generally rectangular, triangular, or round cross sections may also be envisioned.

The connector body 28 is formed of a dielectric material, such as a polymeric or ceramic material. The choice of material will be primarily dependent on the intended application of the connector 16. The connector body 28 may be formed by molding the material into the desired shape. The design and fabrication of connector bodies of this type are well known to those skilled in the art.

As illustrated in FIG. 4, the mating terminal 30 is attached to an end of the wire cable 20, hereinafter the cable 20, and is configured to electrically interconnect to a sensing element terminal 38 of sensing element substrate 18. The mating terminal 30 is made up of an attachment portion 42, a connection portion 44, and a body portion 46.

The attachment portion 42 is configured to attach the mating terminal 30 to the cable 20. In the illustrated embodiment, the attachment portion 42 comprises a pair of crimping wings 48 that are folded and crimped to the cable 20. Other embodiments of the mating terminal 30 may be envisioned, for example in which the attachment portion 42 comprises a tubular section that is crimped or soldered to the cable 20 or a planar section to which the cable 20 is sonically welded. Other attachment means known to those skilled in the art may also be used for the attachment portion 42.

The connection portion 44 of the illustrated embodiment is a flexible member defining a generally triangular shape. The apex of the connection portion 44 defines a flexible contact tab 50 configured to contact the sensing element terminal 38 and flex the connection portion 44 to apply a normal force to the sensing element terminal 38 in order to provide a reliable electrical connection there between. Other embodiments of the terminal may be envisioned in which the connection portion is a male blade, a female socket, or another type of connection portion known to those skilled in the art.

The body portion 46 of the mating terminal 30 is located intermediate the attachment portion 42 and the connection portion 44 and interconnects the two portions and has a generally square cross section. The body portion 46 defines a rigid stop tab 52 that extends laterally from one end of the body portion 46. As used herein, the lateral direction Y is substantially orthogonal to the longitudinal direction X, i.e. ±10° of absolutely orthogonal. Further, as used herein "rigid" means that the stop tab 52 is not deformed when subjected to forces typically experienced in the normal application of the mating terminal 30 and is plastically deformed when subjected to forces greater than those typically experienced in the normal application of the mating terminal 30. The body portion 46 also defines a flexible lock tab 54 on the other end of the body portion 46 that has a fixed end 56 attached to the body portion 46 and a free end 58 extending laterally outwardly, or away, from the body portion 46. The body portion 46 further defines a flexible bias tab 60 located intermediate the stop tab 52 and the lock tab 54. As used herein "flexible" means that the lock tab 54 and/or the bias tab 60 is elastically deformed when subjected to forces typically experienced in this application of the mating terminal 30. The bias tab 60 also has a fixed end 62 attached to the body portion 46 and a free end 64 extending laterally outwardly, or away, from the body portion 46.

Figure 5:
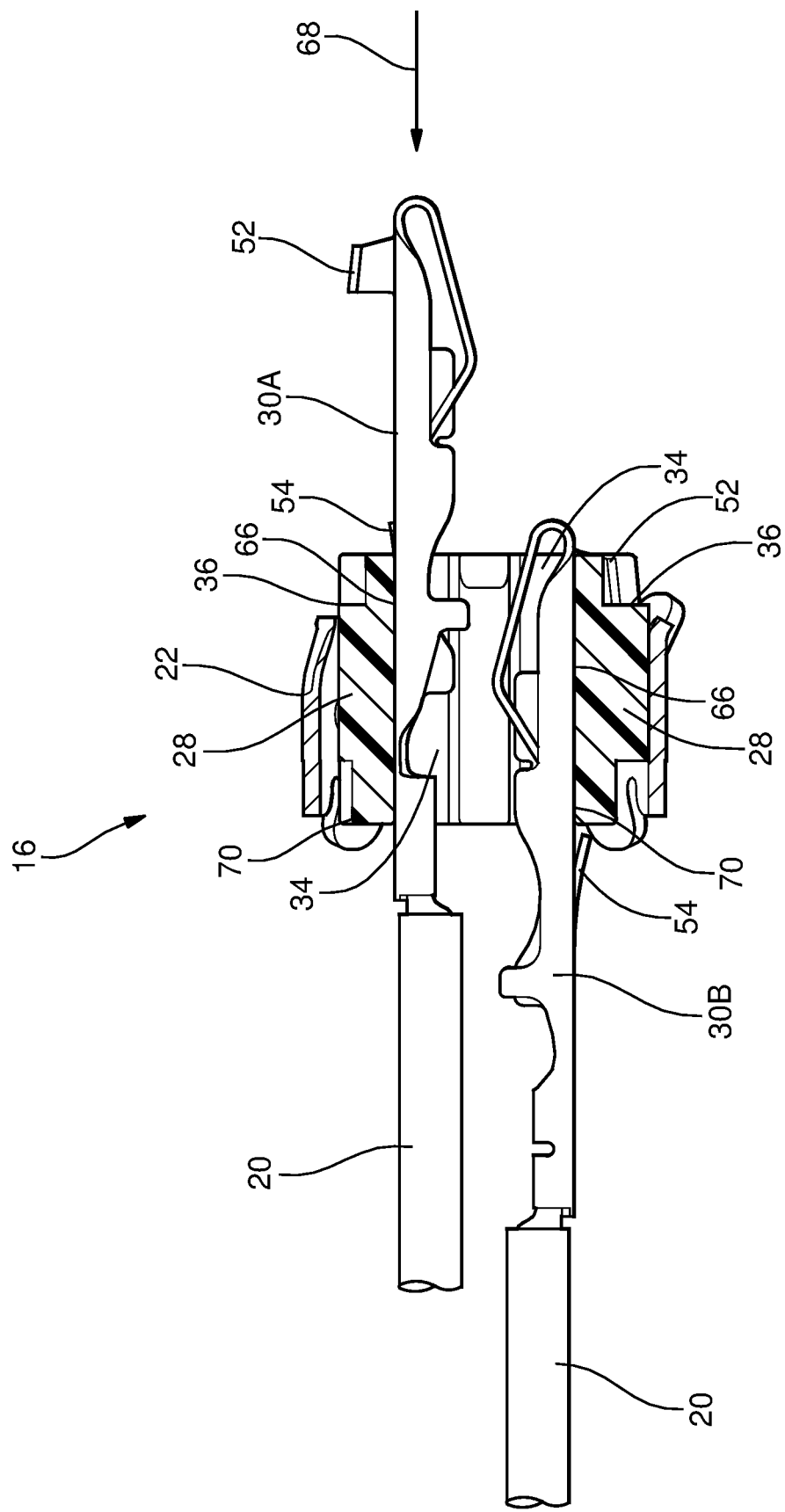
FIG. 5 is a cross sectional view of the electrical connector assembly of FIG. 3 along the plane A-A showing one terminal partially inserted into the connector housing and another terminal fully inserted according to one embodiment.
Figure 7:
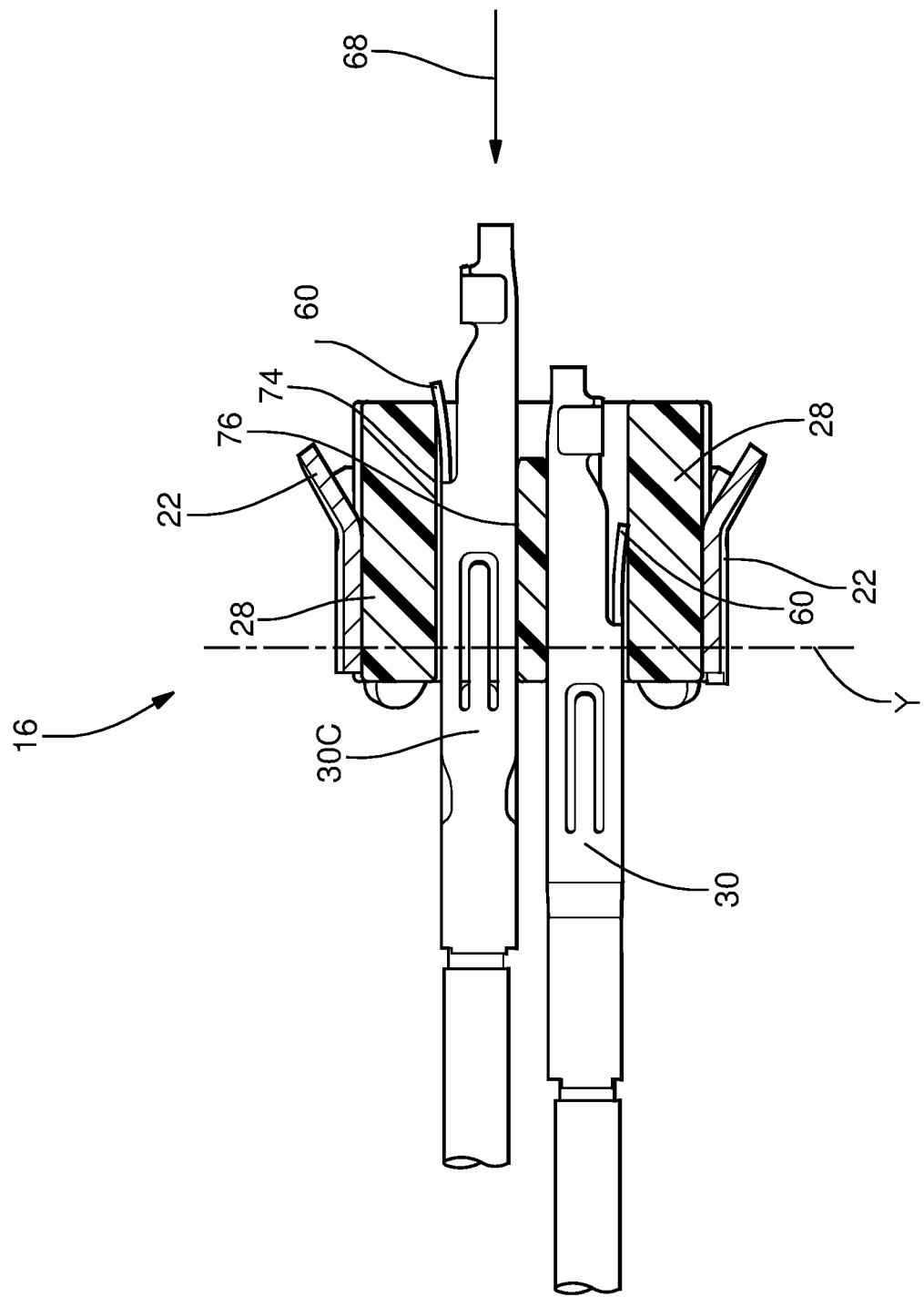
FIG. 7 is a cross sectional view of the electrical connector assembly of FIG. 3 along the plane B-B showing one terminal partially inserted into the connector housing and another terminal fully inserted according to one embodiment.

FIGS. 5 and 7 illustrate a non-limiting process of inserting the mating terminal 30 within the connector body 28. As shown in FIG. 5, the attachment portion 42 of the mating terminal 30 is inserted into the opening 34 in the front surface 36 of the connector body 28. As the mating terminal 30 is pushed through the cavity 32, the free end 58 of the lock tab 54 engages a first inner cavity wall 66 and flexes inwardly toward the body portion 46 as seen with the upper mating terminal 30A. As used herein, "inwardly" means that the free end 58 moves in a substantially lateral direction toward the longitudinal axis of the mating terminal 30.

The mating terminal 30 is inserted into the cavity 32 until the stop tab 52 engages the front surface 36 of the connector body 28 inhibiting further longitudinal movement of the mating terminal 30 in the insertion direction 68. The lock tab 54 is located on the body portion 46 so that when the stop tab 52 engages the front surface 36, the free end 58 of the lock tab 54 is out of the cavity 32 and no longer engaging the first inner cavity wall 66 as seen with the lower mating terminal 30B. The free end 58 of the lock tab 54 then springs outwardly and engages the rear surface 70 of the connector body 28 inhibiting further longitudinal movement of the mating terminal 30 in a direction opposite of the insertion direction 68, thereby inhibiting longitudinal movement of the mating terminal 30 within the cavity 32. As used herein, "outwardly" means that the free end 58 moves in a substantially lateral direction away from the longitudinal axis of the mating terminal 30.

As shown in FIG. 7, as the upper mating terminal 30C is inserted into the cavity 32, the free end 64 of the bias tab 60 engages a second inner cavity wall 74 and urges the mating terminal 30 into contact with a third inner cavity wall 76 that is opposite the second inner cavity wall 74, thereby inhibiting lateral movement of the mating terminal 30 within the cavity 32 as seen. The first inner cavity wall 66 and the second inner cavity wall 74 may be different inner cavity walls or they may be the same inner cavity wall.

As illustrated in FIGS. 5-8, the bias tab 60 does not engage any locking feature that protrudes from an inner wall within the cavity 32 nor does any other feature of the mating terminal 30 engage a locking feature within the cavity 32.

According to the illustrated embodiment, the width of the bias tab 60 width is over 50% of the width of the second inner cavity wall 74. Without subscribing to any particular theory of operation, this width of the bias tab 60 inhibits rotational movement of the mating terminal 30 within the cavity 32. Other embodiments of the terminal may be envisioned having a pair of bias tabs located on the edges of the terminal that would cooperate to inhibit rotational movement of the terminal within the cavity.

Figure 9:
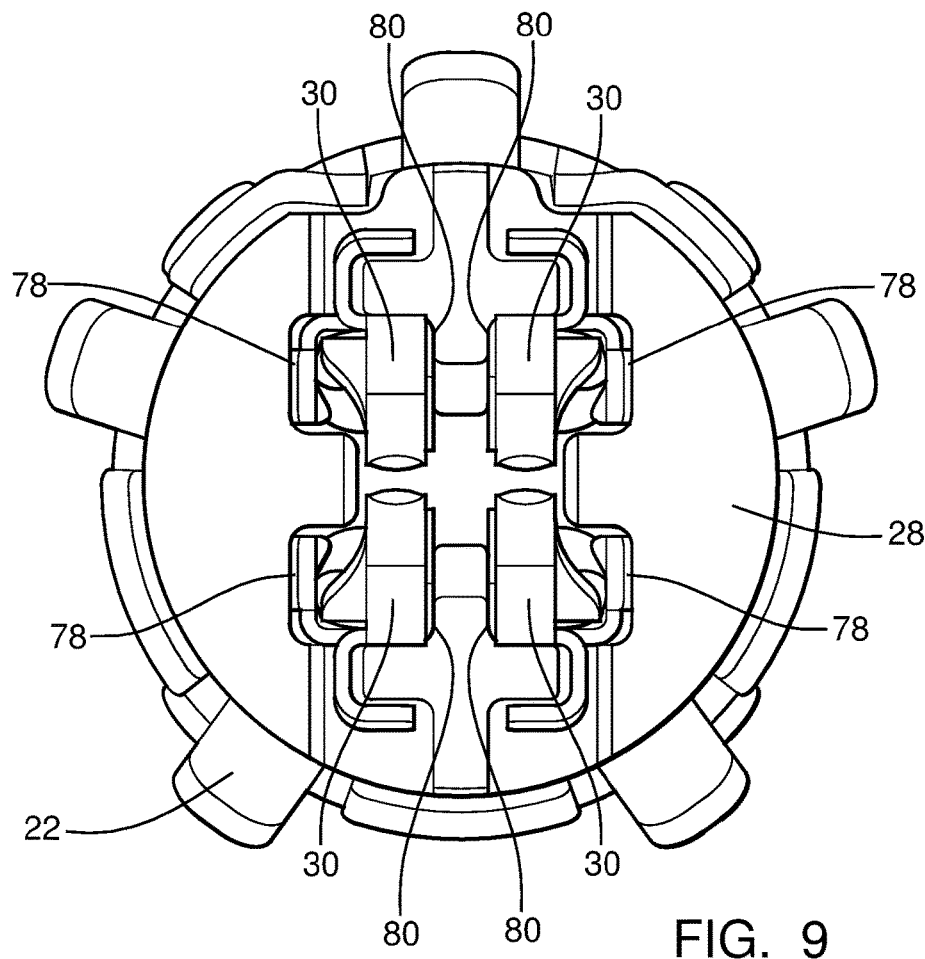
FIG. 9 is an end view of the electrical connector assembly of FIG. 3 according to one embodiment.

As illustrated in FIG. 9, the mating terminals 30 are arranged in the cavities 32 of the connector body 28 such that the bias tab 60 of each one of the mating terminals 30 engages a distal inner cavity wall 78 of each cavity 32 and urges each of the mating terminals 30 toward a mesial inner cavity wall 80 of each cavity 32. As used herein, "distal inner wall" refers to the inner wall of the cavity 32 that is farthest from the central longitudinal axis X of the connector body 28 and "mesial inner wall" refers to the inner wall of the cavity 32 that is closest to the central longitudinal axis X of the connector body 28. This provides the benefit of minimizing the lateral distance between the contact tabs 50 of each of the mating terminals 30 which further minimizes the distance between the corresponding sensing element terminals 38. This allows a smaller mating electrical connector assembly 40 to be used with this connector 16.

Figure 6:
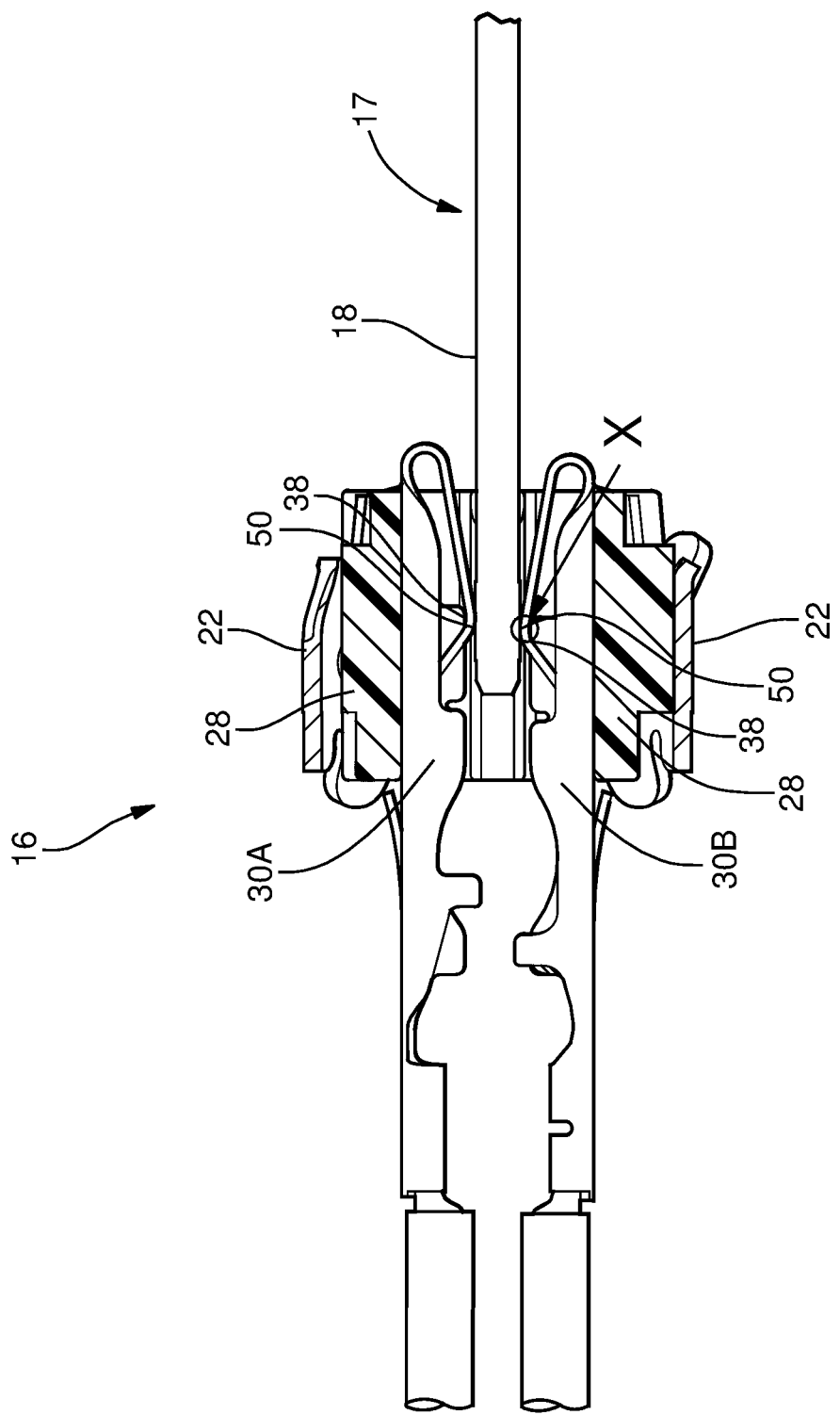
FIG. 6 is a cross sectional view of the electrical connector assembly of FIG. 3 along the plane A-A showing two terminals fully inserted into the connector housing and a circuit board substrate engaging the terminals according to one embodiment.
Figure 8:
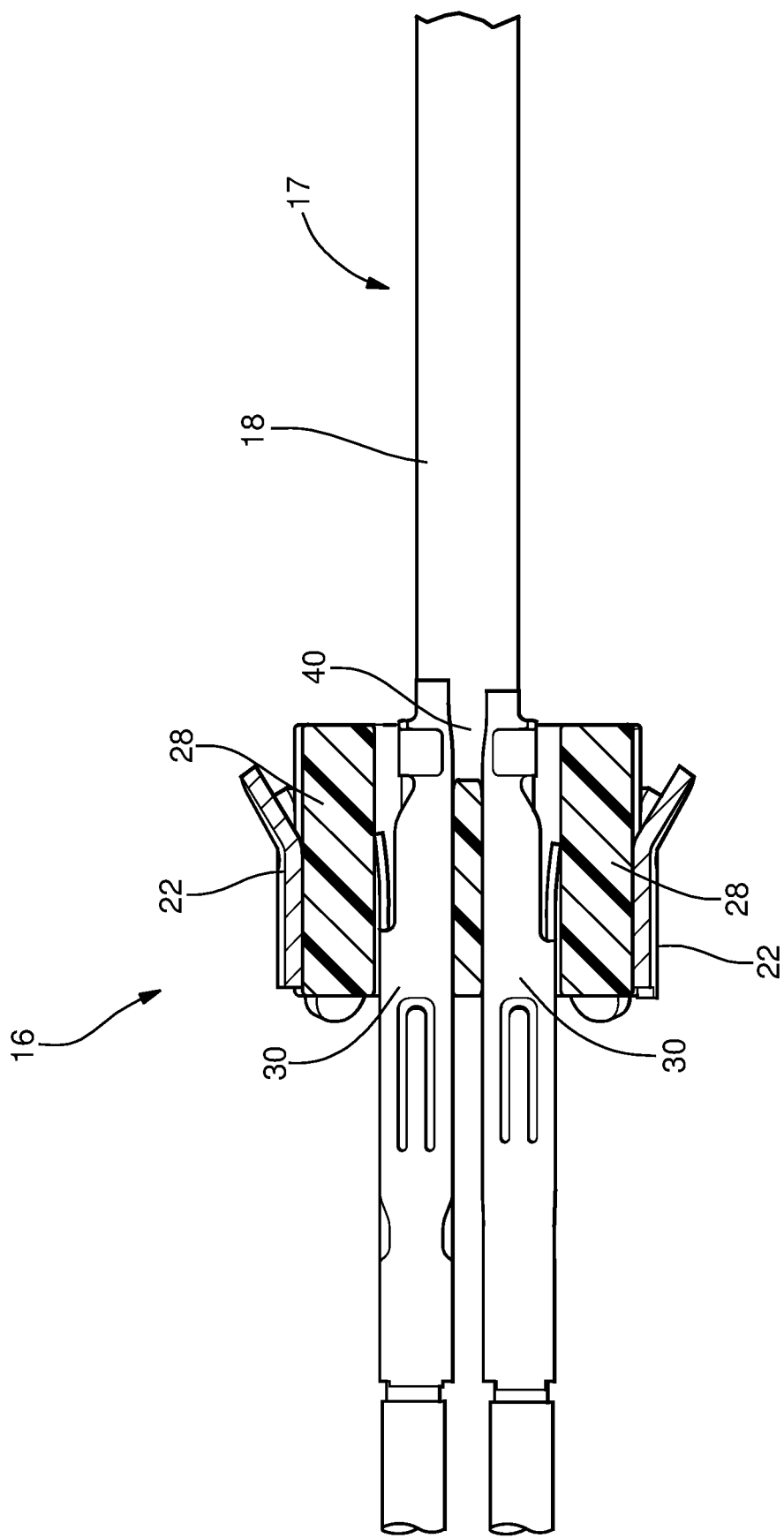
FIG. 8 is a cross sectional view of the electrical connector assembly of FIG. 3 along the plane B-B showing two terminals fully inserted into the connector housing and a circuit board substrate engaging the terminals according to one embodiment.

Sensing element substrate 18 is formed of a ceramic material to accommodate the thermal environment to which exhaust sensor 10 is subjected and defines a mating electrical connector assembly 40 with sensing element terminals 38 formed of conductive pads deposited near the edge of the sensing element substrate 18 that are configured to align with the contact tabs 50 of the connector 16 when sensing element substrate 18 in fully inserted into the connector body 28 of the connector 16 as shown in FIGS. 6 and 8. As shown in FIG. 3, sensing element substrate 18 supports sensing electrodes 82 which, when exposed to exhaust gases, are able to produce an electrical signal that can be used to determine the concentration of a target constituent, for example oxygen, $NO_x$, ammonia, and particulate matter, in the exhaust gases. Each sensing electrode 82 is electrically connected to a respective sensing element terminal 38 through a respective lead 84 for electrical communication therebetween. Additionally, a heating element, not shown, may be connected to other mating terminals in order to elevate exhaust sensor 10 to its operating temperature or to regenerate exhaust sensor 10. Numerous arrangements for electrodes and their leads which are used to sense constituents in exhaust gases are well known to those of ordinary skill in the art and will not be described further herein. However, some examples are illustrated in United States Patent Application Publication Nos. US 2018/0252672 A1 to Wang et al., US 2007/0080075 A1 to Wang et al., US 2007/0080074 A1 to Wang et al., and US 2010/0147052 A1 to Nelson et al., the disclosures of which are hereby incorporated by reference in their entirety.

In alternative embodiments of the connector, the terminal may include a second flexible bias tab (not shown). The bias tab and the second bias tab are configured to engage two adjacent inner walls of the cavity and urge the body of the terminal into contact with two other inner walls of the cavity opposite the two adjacent inner walls, thereby further inhibiting lateral movement of the terminal within the cavity.

Accordingly, an electrical connector assembly 16 is provided. The bias tabs 60 defined by the mating terminals 30 urge the body portions 46 of the mating terminals 30 into contact with the inner walls of the cavities 32, thereby limiting lateral movement of the mating terminal 30 within the cavity 32 and decreasing the lateral positional tolerance required for the connector 16. This allows more precise lateral positioning of the mating terminals 30 which can successfully be used with smaller mating connector assemblies, such as the conductive pads on the edge of sensing element substrate 18. The width of the bias tab 60 also is configured to limit rotational movement of the mating terminal 30 within the cavity 32. The inner walls of the cavities 32 do not define any lock features, thus simplifying the design and fabrication of the connector body 28 and reducing manufacturing cost.

Figure 10:
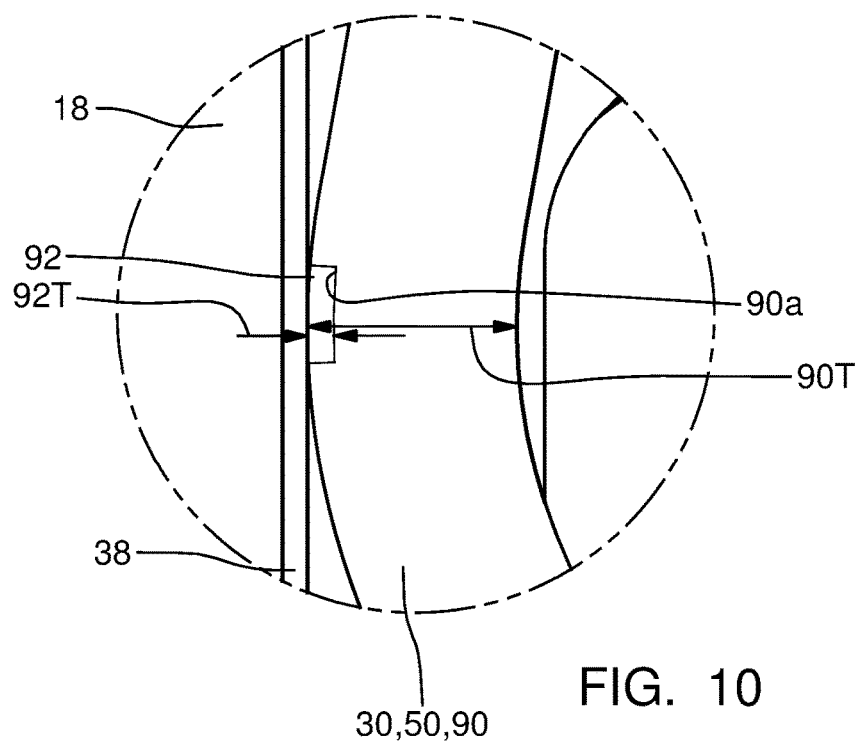
FIG. 10 is an enlargement of a portion of FIG. 6.

Referring now particularly to FIGS. 4 and 10-12, mating terminal 30 includes two distinct materials where a base material 90 accounts for the majority of mating terminal 30 and a clad material 92 is bonded to base material 90 such that clad material 92 is localized to contact directly with sensing element terminal 38 of sensing element substrate 18 as can best be seen in FIG. 10 which is an enlarged portion of FIG. 6 where contact tab 50 of mating terminal 30 contacts sensing element terminal 38.

Figure 11:
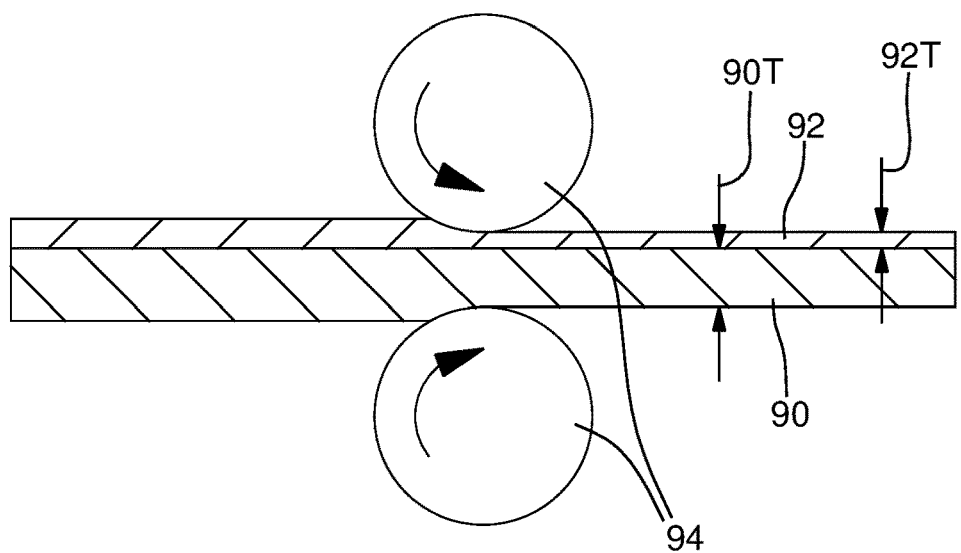
FIG. 11 is a schematic view of a roller apparatus used to prepare a sheet of metal used to form the terminals.

Base material 90 is preferably stainless steel, and may be, by way of non-limiting example only, an SAE 300 series stainless steel or an SAE 400 series stainless steel. Furthermore, base material 90 has a base material thickness 90T which is the thickness of the sheet stock from which mating terminal 30 is formed and is illustrated in FIGS. 10 and 11. Base material thickness 90T is greater than 100 microns (μm) and is preferably about 200 μm. Base material 90 is selected to allow formation of the various previously described features, however, may not prevent an oxide layer from forming on the outer surface thereof during operation of exhaust sensor 10.

At contact tab 50, mating terminal 30 has a mating terminal width 30 W such that base material 90 at contact tab 50 may include a base material groove 90a which extends thereinto from the side thereof which faces toward sensing element terminal 38 such that base material groove 90a extends for the entire extent of mating terminal width 30 W. Base material groove 90a provides a recess into which clad material 92 may be located as will be described in greater detail later.

Clad material 92 is an alloy which comprises, by weight, less than or equal to 20% iron, greater than or equal to 40% nickel, and greater than or equal to 13% chromium. This alloy may be, by way of non-limiting example only, Alloy 625 which is 58.0% nickel, 20.0%-23.0% chromium, 5.0% maximum iron, 8.0%-10.0% molybdenum, 3.15%-4.15% niobium+tantalum, 1.0% maximum cobalt, 0.50% maximum manganese, 0.50% silicon, 0.40% titanium, 0.10% maximum aluminum, 0.015% phosphorus, and 0.015% maximum sulfur; Inconel® 702 which is 0.1% maximum carbon, 1.0% maximum manganese, 2.0% maximum iron, 0.25%-1.0% titanium, 2.75%-3.75% aluminum, 14.0%-17.0% chromium, and the remainder being nickel; or Hastelloy X® which is 0.05%-0.15% carbon, 1.0% maximum manganese, 0.04% maximum phosphorus, 0.03% maximum sulfur, 1.0% maximum silicon, 20.5%-23.0% chromium, 8.0%-10.0% molybdenum, 0.5%-2.5% cobalt, 17.0%-20.0% iron, 0.2%-1.0% tungsten, and the remainder being nickel.

Clad material 92 is inlayed within base material groove 90a and is bonded to mating terminal 30, for example by solid state welding. In order to produce mating terminal 30 with clad material 92 bonded to base material 90, base material groove 90a may be formed by skiving, i.e. scraping, base material groove 90a into a sheet of material from which mating terminal 30 is made. Next, a ribbon of clad material 92 is placed within base material groove 90a and base material 90 with clad material 92 is placed in a roller apparatus 94 as shown in FIG. 11 where the base material 90 and clad material 92 are compressed and preferably decreased in thickness as base material 90 with clad material 92 is passed therethrough. The compression of base material 90 and clad material 92 produces the solid state weld between base material 90 and clad material 92 and brings base material 90 and clad material 92 to their final thicknesses, namely base material thickness 90T and clad material thickness 92T. Finally, the sheet of base material 90 with clad material 92 bonded thereto can be stamped and bent to form one or more mating terminals 30 with the features previously described.

Figure 12:
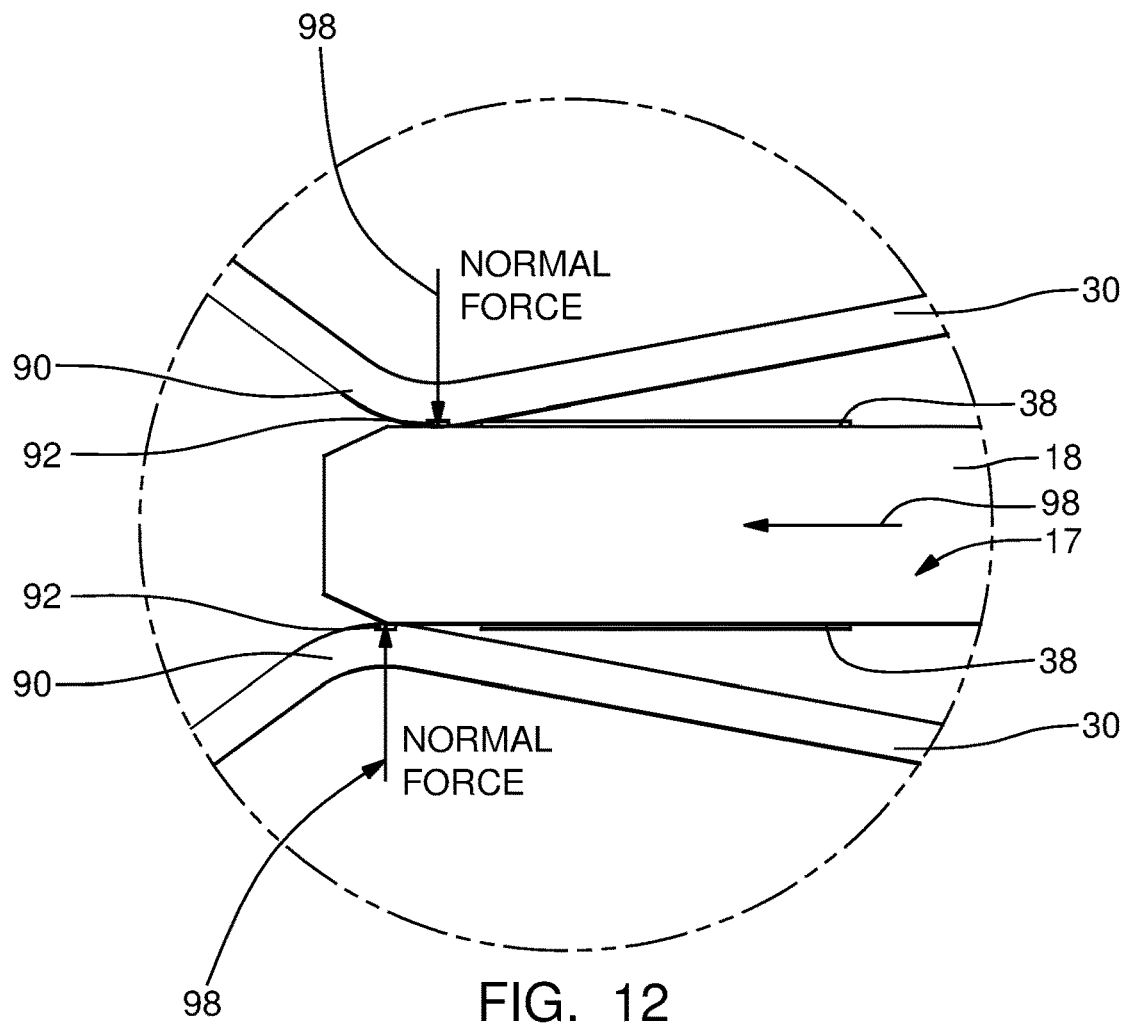
FIG. 12 is an enlarged view showing two terminals being assembled to a sensing element of the exhaust sensor.

Clad material thickness 92T is at least 3 µm in order to be able to accommodate abrasion with sensing element substrate 18 when sensing element 17 is inserted into mating terminals 30, however, clad material thickness 92T is less than ¾ of base material thickness 90T. Preferably, clad material thickness 92T is 20 µm. As illustrated in FIG. 12, when sensing element 17 is inserted between opposing mating terminals 30 in a direction of arrow 96, mating terminals 30 are elastically deflected, thereby engaging sensing element substrate 98 such that normal forces 98 are formed which are each in excess of 1N and preferably is in a range of 4N to 12N. More specifically, clad material 92 of mating terminals 30 slides across sensing element substrate 18 until clad material 92 is situated to engage respective sensing element terminals 38. However, due to the characteristics of clad material 92, mating terminals 30 are not negatively impacted by the abrasive nature of sensing element substrate 18, and as a result, mating terminals 30 are able to withstand elevated temperatures in excess of 400° C. without forming an oxide layer which could compromise the electrical connection between sensing element terminal 38 and mating terminal 30.

In an alternative arrangement, base material groove 90a may be omitted, and clad material 92 may be bonded directly to the top surface of base material 90.

Mating terminal 30 as described herein with base material 90 and clad material 92 provides an economical arrangement which is resistive to forming an oxide layer during operation, thereby maintaining a robust electrical connection with sensing element terminal 38. More specifically, base material 90 allows for reliable formation of the majority of the features of mating terminal 30 while clad material 92, which would not be desirable to form many of the feature of mating terminal 30 due to its forming properties, provides resistance to forming an oxide layer during operation and also is resistive to abrasion from sensing element substrate 18 during assembly. While mating terminal 30 has been described herein as including various specific geometries, it should be understood that numerous variations to the geometry to mating terminal 30 may be envisaged while still incorporating base material 90 and clad material 92 in order to be resistive to forming an oxide layer during operation.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. An exhaust sensor comprising:
    a sensing element with a ceramic sensing element substrate and a sensing element terminal which is electrically conductive and which is supported by the ceramic sensing element substrate such that said sensing element is configured to sense constituents of exhaust gases when exposed thereto;
    a mating terminal which is electrically conductive and which is in electrical communication with said sensing element terminal, said mating terminal having a base material and a clad material bonded to said base material such that said clad material contacts said sensing element terminal and such that said clad material is located between said sensing element terminal and said base material, thereby providing said electrical communication, wherein said clad material is an alloy comprising, by weight, less than or equal to 20% iron, greater than or equal to 40% nickel, and greater than or equal to 13% chromium.

2. An exhaust sensor as in claim 1, wherein said clad material is selected from the group consisting of Alloy 625, Inconel® 702, and Hastelloy X®.

3. An exhaust sensor as in claim 1, wherein said base material has a base material thickness and said clad material has a clad material thickness such that said clad material thickness is less than ¾ said base material thickness.

4. An exhaust sensor as in claim 3, wherein said clad material thickness is greater than 3 µm and said base material has a thickness greater than 100 µm.

5. An exhaust sensor as in claim 1, wherein said base material includes a base material groove and said clad material is inlayed within said base material groove.

6. An exhaust sensor as in claim 1, wherein said clad material is engaged with said sensing element terminal with a normal force that is greater than or equal to 1N.

7. An exhaust sensor as in claim 6, wherein said normal force is in a range of 4N to 12N.

8. An exhaust sensor as in claim 1, wherein said base material is stainless steel.

9. An exhaust sensor as in claim 8, wherein said base material is an SAE 300 series stainless steel or an SAE 400 series stainless steel.

10. An electrical connection comprising:
    ceramic substrate and a terminal which is electrically conductive and which is supported by the ceramic substrate;

a mating terminal which is electrically conductive and which is in electrical communication with said terminal, said mating terminal having a base material and a clad material bonded to said base material such that said clad material contacts said terminal and such that said clad material is located between said terminal and said base material, thereby providing said electrical communication, wherein said clad material is an alloy comprising, by weight, less than or equal to 20% iron, greater than or equal to 40% nickel, and greater than or equal to 13% chromium.

11. An electrical connection as in claim 10, wherein said clad material is selected from the group consisting of Alloy 625, Inconel® 702, and Hastelloy X®.

12. An electrical connection as in claim 10, wherein said base material has a base material thickness and said clad material has a clad material thickness such that said clad material thickness is less than ¾ said base material thickness.

13. An electrical connection as in claim 12, wherein said clad material thickness is greater than 3 μm and said base material has a thickness greater than 100 μm.

14. An electrical connection as in claim 10, wherein said base material includes a base material groove and said clad material is inlayed within said base material groove.

15. An electrical connection as in claim 10, wherein said clad material is engaged with said sensing element terminal with a normal force that is greater than or equal to 1N.

16. An electrical connection as in claim 15, wherein said normal force is in a range of 4N to 12N.

17. An electrical connection as in claim 10, wherein said base material is stainless steel.

18. An electrical connection as in claim 17, wherein said base material is an SAE 300 series stainless steel or an SAE 400 series stainless steel.

* * * * *